No. 862,587. PATENTED AUG. 6, 1907.
J. T. ROWLEY.
LOCKING ATTACHMENT FOR MILK BOTTLES.
APPLICATION FILED APR. 29, 1907.
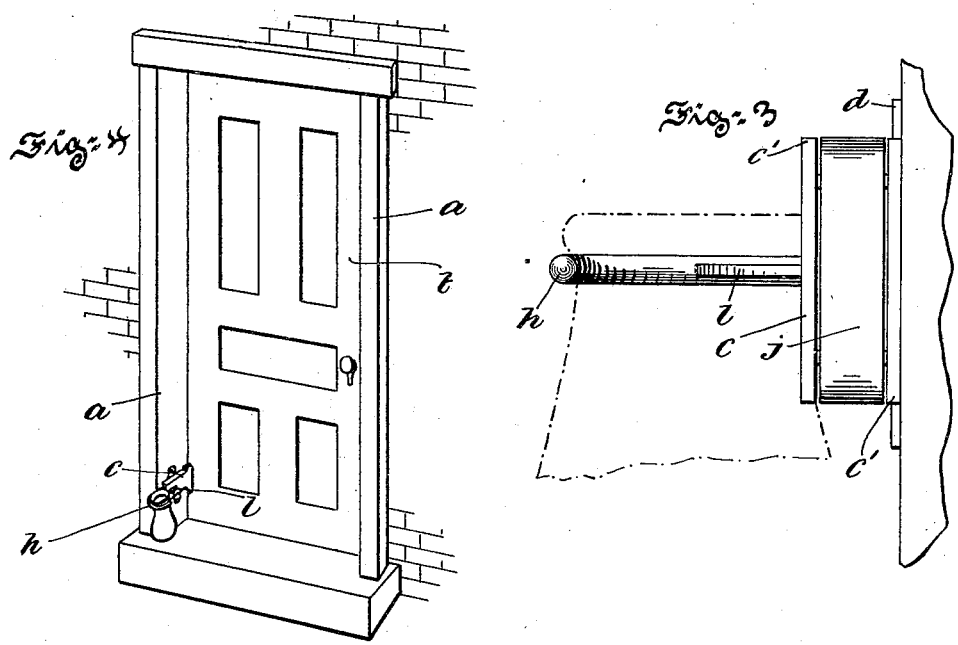
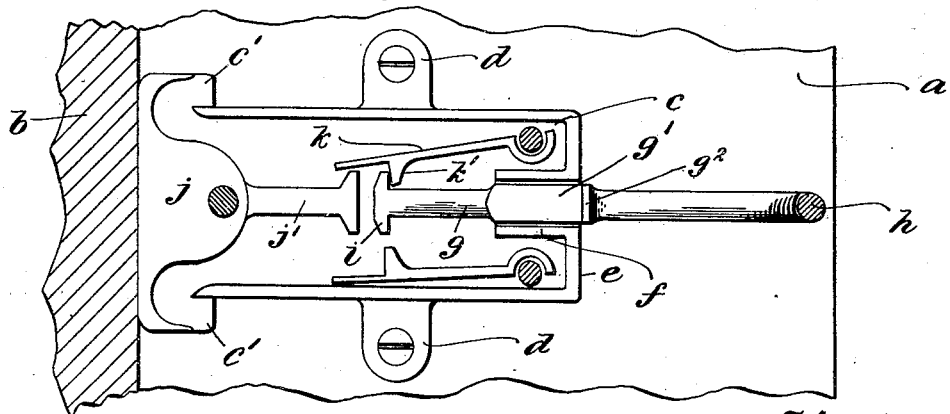
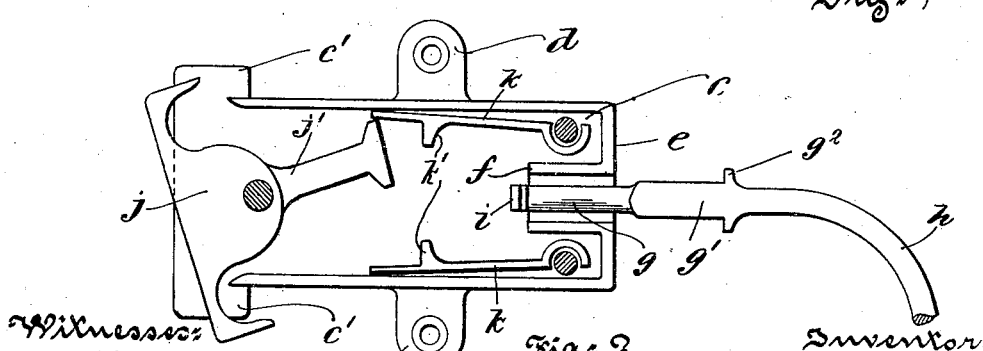
THE NORRIS PETERS CO., WASHINGTON, D. C.

UNITED STATES PATENT OFFICE.

JOHN TURNER ROWLEY, OF PHILADELPHIA, PENNSYLVANIA, ASSIGNOR OF ONE-HALF TO JAMES HENRY WILD, OF PHILADELPHIA, PENNSYLVANIA.

LOCKING ATTACHMENT FOR MILK-BOTTLES.

No. 862,587.　　　　Specification of Letters Patent.　　　　Patented Aug. 6, 1907.

Application filed April 29, 1907. Serial No. 370,817.

*To all whom it may concern:*

Be it known that I, JOHN TURNER ROWLEY, a citizen of the United States, and a resident of Philadelphia, in the county of Philadelphia and State of Pennsylvania, have invented certain new and useful Improvements in Locking Attachments for Milk-Bottles, of which the following is a specification.

This invention relates to devices for preventing milk receptacles from being stolen or the contents thereof being abstracted by unauthorized persons, and the principal object of the present invention is to provide a neat, simple, efficient, and comparatively inexpensive lock that may be attached to the door jamb, whereby milk receptacles may be readily positioned and locked by the dispenser of the commodity upon the street and may only be removed therefrom when the house door is opened.

A further object is to provide a reversible locking attachment that may be used upon door-jambs of which the door is either hinged right or left handed.

A still further object is to provide locking means within the attachment whereby when the house door is opened the said means will automatically release the bottle holding medium, and whereby the said medium may be automatically locked to place to hold a milk receptacle.

To these and other ends hereinafter set forth the invention stated in general terms comprises the improvements to be presently described and finally claimed.

The nature, characteristic features and scope of the invention will be more fully understood from the following description taken in connection with the accompanying drawings forming part hereof, and in which Figure 1, is a view in elevation partly in section of a locking attachment embodying the invention, illustrating the same in locked position. Fig. 2, is a similar view, illustrating the locking attachment in unlocked position. Fig. 3, is a rear view in elevation of the attachment, and Fig. 4, is a perspective view of a house door and door jambs illustrating the application of the attachment thereto.

In the drawings there is shown a door frame having door jambs $a$, and having hinged thereto a door $b$. Adapted to be attached to either door jamb, is an elongated casing $c$, shown as having ears $d$, perforated for the passage of screws that form convenient means for attachment to the jambs $a$. As shown the end wall $e$, of the casing is provided with an inwardly projecting slotted extension $f$, through which the shank $g$, carrying a hook-shaped member $h$, is afforded a slidable and rotatable movement. The shank $g$, is provided with a squared portion $g^1$, adapted to snugly fit within the slotted extension $f$, when in locked position, Fig. 1, and is equipped with stops $g^2$, to limit the endwise movement of the hook member $h$. The remainder of the shank $g$, is of smaller diameter than the slotted portion of the extension $f$, so that the hook may be freely turned within the slot, and is provided with a pair of lugs $i$, that serve to prevent the withdrawal of the hook member $h$, from the casing $c$, and also serve the purpose of assisting in the locking thereof. The end of the casing $c$, opposite the slotted extension is open to receive a pivotally arranged generally T-shaped lever $j$. This lever is afforded a slight swinging movement by reason of the fact that it is pivoted to the casing $c$, at a point out of line with its center of gravity so that when not held in vertical position by the house door $b$, it is caused by its own weight to assume the position shown in Fig. 2. Carried by the inner portion of this lever is a foot $j^1$, adapted to coöperate with one of two pivotally arranged levers $k$, having lugs $k^1$, for causing said lever to be disengaged from the aforesaid shank $g$, when the house door $b$, is opened. In this connection it will be observed that only one of the levers $k$, is called into service for the reason that the bottle locking attachment is made reversible, or in other words, is constructed to be applied to door jambs, the door of which may be either hinged right or left handed. It will be further observed that the casing $c$, is built up or provided with extensions $c^1$, upon either side of the swinging lever $j$. This is important in that it prevents objects being inserted within the casing to "pick" the locking mediums.

In using the locking attachment the hook member $h$, is left in unlocked position, that is with its shank withdrawn to its fullest extent and with its hook depending, see Fig. 2. The house door $b$, is then closed which causes the lever $j$, to assume a vertical position and permits the lever $k$, to gravitate into proper position for locking the parts. When the milkman comes along he gives the hook member $h$, a quarter turn, inserts the neck of a bottle within the hook and pushes the shank thereof into the casing $c$, whereupon it is locked as clearly illustrated in Fig. 1, the bottle being held up against a lateral projection 1, Figs. 3, and 4, upon the side of the said casing. Obviously upon the opening of the house door the locked parts are automatically released and the milk bottle may be readily removed.

I do not intend by the use of the above language or words, to limit my invention further than the appended claims may require, but

Having thus described the nature, and objects of my invention, what I claim as new and desire to secure by Letters Patent is:

1. A reversible device of the character described comprising a casing arranged for attachment to a door-jamb, said casing having a lateral projection and being slotted for the passage of the shank of a hook-member, pivotal means carried within the casing for engaging said shank to prevent its withdrawal and a pivotally arranged lever carried at one end of the casing for coöperation with the free end of said means for disengaging the hook-member upon the opening of the house door.

2. A device of the character described comprising a casing arranged for attachment to a door-jamb, said casing having a lateral projection and being slotted for the passage of the shank of a hook-member, said shank having a lug at its inner end, a pivotally arranged lever having a stop adapted to engage the lug upon the shank to prevent its withdrawal, and a pivotally arranged lever having a foot carried at one end of the casing for coöperation with the free end of the first mentioned lever, for disengaging the hook member upon the opening of the house door.

3. A device of the class described comprising a casing having a lateral projection and being slotted for the passage of the shank of a hook-member, pivotally arranged levers within the casing provided with means for coöperating with means on the shank for locking the hook-member, and a generally T-shaped lever pivotally secured within the casing the foot of which is adapted to coöperate with the free end of said pivotally arranged levers for disengaging the hook members upon the opening of the house door.

In testimony whereof I have hereunto signed my name in the presence of witnesses.

JOHN TURNER ROWLEY.

Witnesses:
　THOMAS BLUETT,
　JANE C. EDEL.